(12) United States Patent
Furuhashi et al.

(10) Patent No.: US 6,552,849 B1
(45) Date of Patent: Apr. 22, 2003

(54) COLOR POLARIZER WITH SUPPORT FOR LIQUID CRYSTAL PROJECTOR AND COLOR LIQUID CRYSTAL PROJECTOR

(75) Inventors: Shigeki Furuhashi, Iwatsuki (JP); Tadashi Matsuo, Joetsu (JP); Kazuyuki Kawabe, Joetsu (JP)

(73) Assignees: Nippon Kayaku Kabushiki Kaisha, Tokyo (JP); Polatechno Co., LTD, Tokyo (JP)

( * ) Notice: Subject to any disclaimer, the term of this patent is extended or adjusted under 35 U.S.C. 154(b) by 0 days.

(21) Appl. No.: 09/857,477

(22) PCT Filed: Dec. 17, 1999

(86) PCT No.: PCT/JP99/07070

§ 371 (c)(1),
(2), (4) Date: Aug. 6, 2001

(87) PCT Pub. No.: WO00/37973

PCT Pub. Date: Jun. 29, 2000

(30) Foreign Application Priority Data

Dec. 18, 1998 (JP) ............................................. 10-360324

(51) Int. Cl.⁷ ................................................. G02B 5/30
(52) U.S. Cl. ........................ 359/491; 359/502; 349/106
(58) Field of Search ................................. 359/483, 490, 359/491, 492, 502, 493; 349/5, 106, 105

(56) References Cited

U.S. PATENT DOCUMENTS

| 4,130,581 A | * | 12/1978 | Ross ............................ 562/70 |
| 4,799,776 A | * | 1/1989 | Yamazaki et al. .......... 349/106 |
| 4,954,133 A | * | 9/1990 | Oppliger ...................... 534/566 |
| 5,007,942 A | | 4/1991 | Claussen et al. ................ 8/506 |
| 5,672,296 A | | 9/1997 | Shen et al. ............. 252/299.01 |
| 5,739,298 A | | 4/1998 | Misawa et al. .............. 534/689 |
| 5,751,389 A | * | 5/1998 | Andreatta et al. ............. 349/97 |
| 6,166,790 A | * | 12/2000 | Kameyama et al. ........ 349/175 |

FOREIGN PATENT DOCUMENTS

| EP | 0 374 655 | 6/1990 |
| EP | 0 584 962 | 3/1994 |
| JP | 59-145255 | 8/1984 |
| JP | 60-156759 | 8/1985 |
| JP | 60-168743 | 9/1985 |
| JP | 61-255304 | 11/1986 |
| JP | 63-189803 | 8/1988 |
| JP | 1-313568 | 12/1989 |
| JP | 3-12606 | 1/1991 |
| JP | 4-293969 | 10/1992 |
| JP | 5-5881 | 1/1993 |

\* cited by examiner

*Primary Examiner*—Mark A. Robinson
*Assistant Examiner*—Joshua Pritchett
(74) *Attorney, Agent, or Firm*—Nields & Lemack

(57) ABSTRACT

The invention is to develop a color polarizing plate with a support, the polarizing plate having both good brightness and polarizing efficiency for a blue channel (for blue light). The color polarizing plate with a support for a liquid crystal projector comprises a polarizing plate containing a stilbene type water-soluble azo dye as a dichroic molecule and a support, wherein the polarizing plate has an average single transmittance of 39% or more and an average crossed transmittance of 0.4% or less at 420 to 500 nm and an average crossed transmittance of 4% or more at 50 to 780 nm.

14 Claims, No Drawings

COLOR POLARIZER WITH SUPPORT FOR LIQUID CRYSTAL PROJECTOR AND COLOR LIQUID CRYSTAL PROJECTOR

TECHNICAL FIELD

The present invention relates to a color polarizing plate with a support for a liquid crystal projector as well as to a liquid crystal projector. Particularly, the present invention relates to a color polarizing plate with a support suitable for a blue channel, which has both good brightness and polarizing efficiency as well as to a color liquid crystal projector using this color polarizing plate.

RELATING ART

In a color liquid crystal projection type display, namely, a color liquid crystal projector, polarizing plates are used in the liquid crystal image-forming section. Then, the reduction in brightness is inevitable because the light is sharply absorbed by the polarizing plates and because the image with an area as small as 1 inch to 6 inches is expanded to that having an area of about 10 inches to 100 and several tens inches. Therefore, the light source having high luminosity is used. On the other hand, there are tenacious demands for further improving the brightness of current projectors. As a consequence, it is reasonable that the light source to be used in such a projector becomes intensified more and more.

In the meantime, a neutral gray iodine-based polarizing plate having good polarizing efficiency was generally used as the polarizing plate in the liquid crystal image-forming section of the color liquid crystal projector. However, because the iodine-based polarizing plate uses iodine as the polarizer, there is the problem of insufficient light resistance, heat resistance and wet heat resistance. In order to solve this problem, a neutral gray polarizing plate using a dye-based dichroic dyestuff as the polarizer has come to be used. However, because the polarizing plate uses a combination of dyes of three primary colors, there is the problem that the transmittance of light of from 420 to 500 nm, so-called the blue channel, is low and the intensity of the light source must be more increased. In order to solve such a problem, three of color polarizing plates, i.e., red channel, green channel and blue channel, which correspond to three primary colors have come to be used.

However, among these three color polarizing plates, there is no color polarizing plate for blue channel (for blue light) which shows both good brightness and polarizing efficiency. The improvement of the color polarizing plate for blue channel has therefore been desired.

DISCLOSURE OF THE INVENTION

The inventors of the present invention have conducted various studies to solve the aforementioned problem and found that a color polarizing plate for blue channel (for blue light) which has both good brightness and polarizing efficiency can be obtained by combining a specific dichroic dyestuff. Accordingly, the present invention relates to:

(1) A color polarizing plate with a support for a liquid crystal projector comprising a polarizing plate containing a stilbene type water-soluble azo dye as a dichroic molecule and a support, wherein the polarizing plate has an average single transmittance of 39% or more and an average crossed transmittance of 0.4% or less at 420 to 500 nm and an average crossed transmittance of 60% or more at 650 to 780 nm.

(2) The color polarizing plate with a support for a liquid crystal projector according to (1), wherein the stilbene type water-soluble azo dye is a reaction product between 4,4'-dinitro-2,2'-stilbenedisulfonic acid and a monoazo compound having an aminophenylazobenzene structure.

(3) The color polarizing plate with a support for a liquid crystal projector according to (2), wherein the monoazo compound having an aminophenylazobenzene structure is a dye represented by the formula (1) as a free acid:

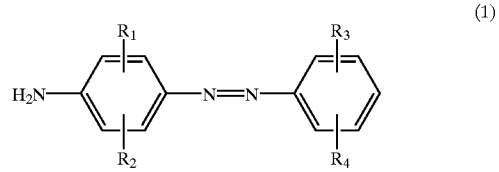

wherein $R_1$ and $R_2$ independently represent a hydrogen atom, an alkyl group or an alkoxy group, $R_3$ represents a sulfonic acid group or a carboxyl group and $R_4$ represents a hydrogen atom, a hydroxyl group or an alkoxy group.

(4) The color polarizing plate with a support for a liquid crystal projector according to any one of (1) to (3), the plate containing a J acid type water-soluble azo dye as the dichroic molecule.

(5) The color polarizing plate with a support for a liquid crystal projector according to (4), wherein the J acid type water-soluble azo dye is a water-soluble azo dye having a benzeneazobenzeneazo J acid structure.

(6) The color polarizing plate with a support for a liquid crystal projector according to (5), wherein the water-soluble azo dye having the benzeneazobenzeneazo J acid structure is a dye represented by the formula (2) as a free acid:

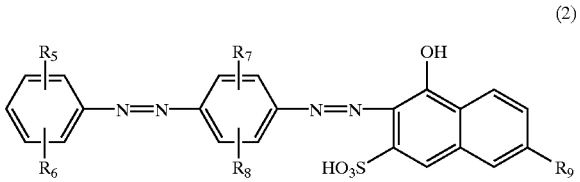

wherein $R_5$ represents a sulfonic acid group or a carboxyl group, $R_6$ represents a hydrogen atom, a hydroxyl group or an alkoxy group, $R_7$ and $R_8$ independently represent a hydrogen atom, a hydroxyl group, an alkyl group or an alkoxy group and $R_9$ represents an amino group, a substituted amino group or a substituted phenylazo group.

(7) The color polarizing plate with a support for a liquid crystal projector according to (6), wherein the substituted amino group of $R_9$ is a phenylamino group, a benzoylamino group or a p-aminobenzoylamino group and the substituted phenylazo group is a 4-hydroxyphenyl-1-azo group.

(8) The color polarizing plate with a support for a liquid crystal projector according to any one of (4) to (7), wherein the proportion of the J acid type water-soluble azo dye to be used is 80% by weight or less of the total amount of the dichroic molecule.

(9) The color polarizing plate with a support for a liquid crystal projector according to any one of (1) to (8), wherein the support is a glass molded or formed article.

(10) The color polarizing plate with a support for a liquid crystal projector according to (9), wherein the glass molded or formed article is a molded or formed article made of inorganic glass or organic glass.

(11) The color polarizing plate with a support for a liquid crystal projector according to (9) or (10), wherein the glass molded or formed article is a glass plate, a lens or a prism.

(12) The color polarizing plate with a support for a liquid crystal projector according to (9), wherein the glass molded or formed article is a liquid crystal cell.

(13) The color polarizing plate with a support for a liquid crystal projector according to any one of (1) to (12), wherein the plate is used for a blue channel.

(14) A color liquid crystal projector wherein the color polarizing plate with a support according to any one of (1) to (12) being arranged in a blue channel.

(15) A color liquid crystal projector wherein the color polarizing plate with a support according to any one of (1) to (11) being arranged on the incident side of a liquid crystal cell for blue channel so as not to be in contact with the liquid crystal cell.

(16) The color liquid crystal projector according to (15), wherein the polarizing plate surface of the color polarizing plate with a support on the incident side is arranged on the side of the liquid crystal cell.

(17) A color liquid crystal projector wherein the color polarizing plate with a support according to any one of (1) to (11) being arranged on the exit side of a liquid crystal cell for blue channel so as not to be in contact with the liquid crystal cell.

(18) A color liquid crystal projector wherein the color polarizing plates with a support according to (11) being arranged on each of the incident and exit sides of a liquid crystal cell for blue channel so as not to be in contact with the liquid crystal cell.

(19) A color liquid crystal projector wherein the color polarizing plate with a support according to (12) being arranged as a liquid crystal cell for blue channel such that the surface of the polarizing plate is made to be the exit side.

(20) The color liquid crystal projector according to (19), wherein the color polarizing plate with a support according to (11) is arranged on the incident side of a liquid crystal cell for blue channel so as not to be in contact with the liquid crystal cell.

(21) A color polarizing plate with a support for a liquid crystal projector comprising a polarizing plate containing a stilbene type water-soluble azo dye as a dichroic molecule and a support, wherein the polarizing plate has an average single transmittance of 39% or more and an average crossed transmittance of 0.4% or less at 420 to 500 nm and an average crossed transmittance of 4% or more at 650 to 780 nm.

EMBODIMENT OF THE INVENTION

A color polarizing plate with a support for a liquid crystal projector according to the present invention comprises a polarizing plate containing a stilbene type water-soluble azo dye as a dichroic molecule and a support, wherein the polarizing plate has an average single transmittance of 39% or more and an average crossed transmittance of 0.4% or less at 420 to 500 nm and an average crossed transmittance of 4% or more at 650 to 780 nm. It is preferable that the polarizing plate have an average single transmittance of 41% or more and an average crossed transmittance of 0.3% or less at 420 to 500 nm and an average crossed transmittance of 20% or more at 650 to 780 nm. It is more preferable that the polarizing plate have an average single transmittance of 42% or more and an average crossed transmittance of 0.1% or less at 420 to 500 nm and an average crossed transmittance of 60% or more at 650 to 780 nm. The average single transmittance is defined as an average of ray transmittances through one polarizing plate having no support within a specific wavelength range at the incident of natural light to the plate. The average crossed transmittance is defined as an average of ray transmittances through two polarizing plates having no support within a specific wavelength range at the incident of natural light to the polarizing plates which are crossed positioned to one another. Incidentally, a polarizing plate having no support but having an AR layer on one surface of the plate as set forth below is also included in the polarizing plate having no support.

The stilbene type water-soluble azo dye to be used in the present invention is preferably a water-soluble azo dye which is a reaction product between 4,4'-dinitro-2,2'-stilbenedisulfonic acid and a monoazo compound having an aminophenylazobenzene structure. For example, 4,4'-dinitro-2,2'-stilbenedisulfonic acid and a monoazo compound are alkali-condensed in a molar ratio of, for example, about 1:1 (the former: the latter) to about 1:1.2 by using, for example, sodium hydroxide and the condensate is then reduced using a reducing agent such as sodium sulfide or glucose to obtain the azo dye to be intended. Examples of the stilbene type water-soluble azo dye include C.I. Direct Orange 39 (the raw material is a compound represented by the aforementioned formula (1) wherein $R_1$, $R_2$ and $R_4$ are all hydrogen atoms and $R_3$ is a sulfonic group at the fourth position) and C.I. Direct Orange 41 (the raw material is a compound represented by the aforementioned formula (1) wherein $R_1$ is a methyl group at the second position, $R_2$ is a methyl group at the fifth position, $R_3$ is a sulfonic acid group at the third position and $R_4$ is a methoxy group at the third position).

In the aforementioned formula (1), $R_1$ and $R_2$ independently represent a hydrogen atom, an alkyl group or an alkoxy group. As the alkyl group, $C_1$ to $C_4$ alkyl groups such as a methyl group are exemplified and as the alkoxy group, $C_1$ to $C_4$ alkoxy groups such as a methoxy group are exemplified. The substituted position of each of these groups is the second position for $R_1$ and the fifth position for $R_2$ when the bond position of an azo group is the first position. $R_3$ is a sulfonic acid group or a carboxyl group and preferably bonded to the third or fourth position when the bond position of an azo group is the first position. Also, $R_4$ is a hydrogen atom, a hydroxyl group or an alkoxy group. As the alkoxy group, $C_1$ to $C_4$ alkoxy groups such as a methoxy group are exemplified. The substituted position of the hydroxyl group or alkoxy group is preferably the fourth position when the bond position of an azo group is the first position.

Examples of a preferable combination of $R_1$, $R_2$, $R_3$ and $R_4$ include a combination in which $R_3$ is a sulfonic acid group or a carboxyl group and all of $R_1$, $R_2$ and $R_4$ are hydrogen atoms and a combination in which $R_3$ is a sulfonic acid group or a carboxyl group and all of $R_1$ and $R_2$ are methyl groups and $R_4$ is a hydrogen atom or a methoxy group. Typical examples of the monoazo compound represented by the aforementioned formula (1) are shown below.

TABLE 1

| No. | $R_1$ | $R_2$ | $R_3$ | $R_4$ |
| --- | --- | --- | --- | --- |
| 1. | H | H | 4-sulfonic acid group | H |
| 2. | H | H | 3-sulfonic acid group | 4-methoxy group |
| 3. | H | H | 3-carboxyl group | 4-hydroxyl group |
| 4. | 2-methyl group | 5-methyl group | 4-sulfonic acid group | H |
| 5. | 2-methyl group | 5-methyl group | 3-sulfonic acid group | 4-methoxy group |
| 6. | 2-methyl group | 5-methyl group | 3-carboxyl group | 4-hydroxyl group |
| 7. | 2-methyl group | 5-methoxy group | 4-sulfonic acid group | H |
| 8. | 2-methyl group | 5-methoxy group | 3-sulfonic acid group | 4-methoxy group |
| 9. | 2-methyl group | 5-methoxy group | 3-carboxyl group | 4-hydroxyl group |
| 10. | 2-methoxy group | 5-methoxy group | 4-sulfonic acid group | H |
| 11. | 2-methoxy group | 5-methoxy group | 3-sulfonic acid group | 4-methoxy group |
| 12. | 2-methoxy group | 5-methoxy group | 3-carboxyl group | 4-hydroxyl group |

The color polarizing plate for a liquid crystal projector according to the present invention may include a J acid type water-soluble azo dye as the dichroic molecule. The inclusion of the J acid type water-soluble azo dye makes it possible to expand a wavelength range where the average crossed transmittance is 0.4% or less with minimizing the reduction in the average single transmittance. The amount of the azo dye to be incorporated is 80% by weight or less in the total amount of the dichroic molecule. As the J acid type water-soluble azo dye, water-soluble azo dyes having a benzeneazobenzeneazo J acid structure are preferred and represented, for example, by the aforementioned formula (2). In the formula (2), $R_5$ is a sulfonic acid group or a carboxyl group. Each of these groups is preferably bonded to the third or fourth position when the bond position of an azo group is the first position. $R_6$ is a hydrogen atom, a hydroxyl group or an alkoxy group. Examples of the alkoxy group include $C_1$ to $C_4$ alkoxy groups such as a methoxy group. The substituted position of the hydroxyl group or alkoxy group is preferably the fourth position when the bond position of an azo group is the first position. $R_7$ and $R_8$ independently are a hydrogen atom, a hydroxyl group, an alkyl group or an alkoxy group and preferable examples of each of $R_7$ and $R_8$ include a hydrogen atom, $C_1$ to $C_4$ alkyl groups such as a methyl group and $C_1$ to $C_4$ alkoxy groups such as a methoxy group. The substituted position is preferably the second position for $R_7$ and the fifth position for $R_8$ when the bond position of an azo group is the first position. $R_9$ represents an amino group, a substituted amino group or a substituted phenylazo group. Examples of the substituted amino group include a phenylamino group, benzoylamino group and p-aminobenzoylamino group. Examples of the substituted phenylazo group include a 4-hydroxyphenyl-1-azo group.

Examples of the J acid type disazo dye include C.I. Direct Red 81 and C.I. Direct Violet 9. Typical examples of this dye are shown below. In Table 2, Ph represents a phenylamino group, Bz represents a benzoylamino group, p-ABz represents a p-aminobenzoylamino group and 4-HPhAZ represents a 4-hydroxyphenyl-1-azo group.

TABLE 2

| No. | $R_5$ | $R_6$ | $R_7$ | $R_8$ | $R_9$ |
| --- | --- | --- | --- | --- | --- |
| 1. | 4-sulfonic acid group | H | H | H | Ph |
| 2. | 3-sulfonic acid group | 4-methoxy group | H | H | Ph |
| 3. | 3-carboxyl group | 4-hydroxyl group | H | H | Ph |
| 4. | 4-sulfonic acid group | H | 2-methyl group | 5-methyl group | Ph |
| 5. | 3-sulfonic acid group | 4-methoxy group | 2-methyl group | 5-methyl group | Ph |
| 6. | 3-carboxyl group | 4-hydroxyl group | 2-methyl group | 5-methyl group | Ph |
| 7. | 4-sulfonic acid group | H | 2-methyl group | 5-methoxy group | Ph |
| 8. | 3-sulfonic acid group | 4-methoxy group | 2-methyl group | 5-methoxy group | Ph |
| 9. | 3-carboxyl group | 4-hydroxyl group | 2-methyl group | 5-methoxy group | Ph |
| 10. | 4-sulfonic acid group | H | 2-methoxy group | 5-methoxy group | Ph |
| 11. | 3-sulfonic acid group | 4-methoxy group | 2-methoxy group | 5-methoxy group | Ph |
| 12. | 3-carboxyl group | 4-hydroxyl group | 2-methoxy group | 5-methoxy group | Ph |
| 13. | 4-sulfonic acid group | H | H | H | Bz |
| 14. | 3-sulfonic acid group | 4-methoxy group | H | H | Bz |
| 15. | 3-carboxyl group | 4-hydroxyl group | H | H | Bz |
| 16. | 4-sulfonic acid group | H | 2-methyl group | 5-methyl group | Bz |
| 17. | 3-sulfonic acid group | 4-methoxy group | 2-methyl group | 5-methyl group | Bz |
| 18. | 3-carboxyl group | 4-hydroxyl group | 2-methyl group | 5-methyl group | Bz |
| 19. | 4-sulfonic acid group | H | 2-methyl group | 5-methoxy group | Bz |
| 20. | 3-sulfonic acid group | 4-methoxy group | 2-methyl group | 5-methoxy group | Bz |
| 21. | 3-carboxyl group | 4-hydroxyl group | 2-methyl group | 5-methoxy group | Bz |
| 22. | 4-sulfonic acid group | H | 2-methoxy group | 5-methoxy group | Bz |
| 23. | 3-sulfonic acid group | 4-methoxy group | 2-methoxy group | 5-methoxy group | Bz |
| 24. | 3-carboxyl group | 4-hydroxyl group | 2-methoxy group | 5-methoxy group | Bz |
| 25. | 4-sulfonic acid group | H | H | H | p-ABz |
| 26. | 3-sulfonic acid group | 4-methoxy group | H | H | p-ABz |
| 27. | 3-carboxyl group | 4-hydroxyl group | H | H | p-ABz |
| 28. | 4-sulfonic acid group | H | 2-methyl group | 5-methyl group | p-ABz |
| 29. | 3-sulfonic acid group | 4-methoxy group | 2-methyl group | 5-methyl group | p-ABz |
| 30. | 3-carboxyl group | 4-hydroxyl group | 2-methyl group | 5-methyl group | p-ABz |
| 31. | 4-sulfonic acid group | H | 2-methyl group | 5-methoxy group | p-ABz |
| 32. | 3-sulfonic acid group | 4-methoxy group | 2-methyl group | 5-methoxy group | p-ABz |
| 33. | 3-carboxyl group | 4-hydroxyl group | 2-methyl group | 5-methoxy group | p-ABz |
| 34. | 4-sulfonic acid group | H | 2-methoxy group | 5-methoxy group | p-ABz |
| 35. | 3-sulfonic acid group | 4-methoxy group | 2-methoxy group | 5-methoxy group | p-ABz |
| 36. | 3-carboxyl group | 4-hydroxyl group | 2-methoxy group | 5-methoxy group | p-ABz |
| 37. | 4-sulfonic acid group | H | H | H | 4-HPhAz |
| 38. | 3-sulfonic acid group | 4-methoxy group | H | H | 4-HPhAz |

TABLE 2-continued

| No. | $R_5$ | $R_6$ | $R_7$ | $R_8$ | $R_9$ |
|---|---|---|---|---|---|
| 39. | 3-carboxyl group | 4-hydroxyl group | H | H | 4-HPhAz |
| 40. | 4-sulfonic acid group | H | 2-methyl group | 5-methyl group | 4-HPhAz |
| 41. | 3-sulfonic acid group | 4-methoxy group | 2-methyl group | 5-methyl group | 4-HPhAz |
| 42. | 3-carboxyl group | 4-hydroxyl group | 2-methyl group | 5-methyl group | 4-HPhAz |
| 43. | 4-sulfonic acid group | H | 2-methyl group | 5-methoxy group | 4-HPhAz |
| 44. | 3-sulfonic acid group | 4-methoxy group | 2-methyl group | 5-methoxy group | 4-HPhAz |
| 45. | 3-carboxyl group | 4-hydroxyl group | 2-methyl group | 5-methoxy group | 4-HPhAz |
| 46. | 4-sulfonic acid group | H | 2-methoxy group | 5-methoxy group | 4-HPhAz |
| 47. | 3-sulfonic acid group | 4-methoxy group | 2-methoxy group | 5-methoxy group | 4-HPhAz |
| 48. | 3-carboxyl group | 4-hydroxyl group | 2-methoxy group | 5-methoxy group | 4-HPhAz |

The above dichroic azo dye to be used in the present invention is used in the form of a free acid, lithium salt, sodium salt, potassium salt, ammonium salt, ethanolamine salt or alkylamine salt and preferably a sodium salt.

The color polarizing plate used in the present invention may be manufactured, for instance, by dyeing a polymer film using the aforementioned stilbene type water-soluble azo dye or, as required, a composition compounded with the J acid type water-soluble dye, monoaxially orienting the polymer film and, as required, holding the oriented film between support films. The color polarizing plate may also be manufactured by dyeing the polymer film using said compounded composition after the polymer film is monoaxially oriented. Examples of the method of monoaxially orienting the polymer film include a wet method and a dry method. The draw ratio in the orientation may be about 4 to 6 times in general.

Examples of the polymer film include base materials for polarizing film such as a PVA (polyvinyl alcohol) type film, PVA type films obtained by modifying the PVA film by using an olefin such as ethylene or propylene or an unsaturated carboxylic acid such as crotonic acid, acrylic acid, methacrylic acid or maleic acid, EVA (ethylene/vinyl acetate) resin, saponified EVA resin, nylon resin or polyester resin. Among these materials, a PVA type film is preferred in view of the adhesiveness and orientation characteristics of the dye. Examples of the PVA type film include a PVA film and polyvinylbutyral film. Among these films, a PVA film is preferred. The film thickness of the polarizing film is about 10 to 50 $\mu$ and preferably about 25 to 35 $\mu$.

The dyeing may be carried out in the following manner. First, the aforementioned dichroic dye is dissolved in water to prepare a dye bath. The concentration of the dye in the dye bath is, though not particularly limited thereto, generally about 0.0001 to 10% by weight. Also, dyeing auxiliaries may optionally be used and it is preferable to use mirabilite (Glauber's salt) in an amount of 1 to 10% by weight, for example. The polymer film is immersed in the dye bath prepared in the above manner to carry out dyeing. The dyeing temperature is preferably 40 to 80° C. When the dyeing and monoaxial orientation are performed at the same time, a polymer film such as a polyvinyl alcohol film may be immersed in the dye bath having a temperature of, preferably, 40 to 80° C. and thereafter, in an aqueous solution containing mirabilite, the film may be monoaxially expanded by 4 to 6 times in the length from the original in the axial direction in a free width monoaxially expansion, followed by washing with water and drying.

The orientated polymer film containing the dichroic dye may optionally be subjected to an after-treatment such as a conventional treatment using boric acid or borax. This after-treatment may be carried out with the intention of improving the ray transmittance, polarizing efficiency and durability of the polarizing film. The treatment using boric acid or borax is usually carried out in the condition that the concentration of boric acid or borax in the boric acid or borax solution is in a range from 1 to 15% by weight and preferably 5 to 10% by weight and the treatment temperature is in a range from 30 to 80° C. and preferably 50 to 75° C. Moreover, fixing treatment may be performed together using an aqueous solution containing a cationic polymer compound, if necessary.

Although the polarizing film alone has a polarizing function, it is preferable that a protective film such as triacetyl cellulose be laminated on and stuck to each of both surfaces of the polarizing film to form a polarizing plate in order to impart to the film the sufficient durability against severe surrounding conditions such as intensive radiation of rays, high temperature or high temperature with high humidity. Examples of the protective film include cellulose acetate type films such as a TAC (triacetyl cellulose) film, acrylic films, fluoro type films such as an ethylene tetrafluoride/propylene hexafluoride type copolymer film and those comprising a polycarbonate resin, polyester resin, polyolefin resin or polyamide resin, which is formed into a film. Among these films, a TAC film is desirable. The film thickness of the protective film may preferably be about 30 to 250 $\mu$ and preferably about 50 to 190 $\mu$.

A transparent protective layer may be further disposed on the surface of the color polarizing plate used in the present invention. As the protective layer, an acrylic type or polysiloxane type hard coat layer and an urethane type protective layer are exemplified. Also, in order to more improve the single transmittance, an AR (anti-reflecting) layer is preferably disposed on the protective layer. The AR layer may be formed using a material such as silicon dioxide or titanium oxide by vapor deposition (vaporization) or sputtering onto the protective layer. The AR layer may also be formed as a thin layer of a fluoro material by spreading the material on the protective layer. It is to be noted that an elliptically polarizing plate obtained by adhering a retardation film (plate) to a polarizing plate is also included in the polarizing plate of the present invention.

The color polarizing plate with a support for a liquid crystal projector according to the present invention can be produced by adhering the aforementioned polarizing plate to a support. The support preferably has a flat portion because the polarizing plate is adhered thereto. It is preferable that the support being a glass molded product because the polarizing plate with a support is to be used in optical applications. Examples of the glass molded product include a glass plate, lens, prism (e.g., a triangle prism and cubic prism). Products obtained by adhering the polarizing plate to a lens may be used as a condenser lens with a polarizing plate in a liquid crystal projector. Also, products obtained by adhering the polarizing plate to a prism may be used as a polarizing beam splitter with a polarizing plate or as a dichroic prism with a polarizing plate in a liquid crystal projector. In addition, a liquid crystal cell is also included in the support of the present invention because a plain glass plate is used therein. Examples of materials for the glass include inorganic type glass such as soda glass, boro-silicate glass and sapphire glass and organic type glass such as an acryl and polycarbonate glass. Among these glass materials, inorganic type glass is preferable. Though not particularly limited thereto, the shape of the glass plate may be rectangle, square or circle and generally be rectangle. The size of the glass plate may be optional, for example, length or diameter of the glass plate may be about 5 to 300 mm and preferably about 20 to 200 mm. The thickness of the glass plate is about 0.5 to 5 mm and preferably about 0.7 to 2.3 mm. The size of a lens or prism may be optional. The polarizing plate with a glass plate according to the present invention may preferably be provided with an AR layer on the glass surface or on the polarizing plate surface or on both of the surfaces in order to further improve the single transmittance.

In one embodiment of the process for the production of the color polarizing plate with a support for a liquid crystal projector according to the present invention, a transparent adhesive (pressure sensitive adhesive) agent is applied to the plane portion of the support and the polarizing plate is then adhered to the portion via the adhesive agent. Alternatively, a transparent adhesive (pressure sensitive adhesive) agent may be applied to the polarizing plate and then a support may be adhered to the plate via the adhesive agent. As the adhesive (pressure sensitive adhesive) agent used herein, an acrylate type adhesive agent is preferable. Incidentally, when an elliptically polarizing plate is used as the polarizing plate, the polarizing plate is generally adhered to a glass molded product on the retardation film (plate) side of the polarizing plate, however the polarizing plate may also be adhered to the support (a glass molded product) on the polarizing plate side of the polarizing plate.

The color liquid crystal projector of the present invention is obtained by arranging the aforementioned color polarizing plate with a support in a blue channel portion. The polarizing plate on the incident side is exposed to intensive light. The temperature of the polarizing plate is therefore raised. When, like an usual liquid crystal element, the liquid crystal cell is in close contact with the polarizing plate on the incident side, the heat of the polarizing plate on the incident side is to be conducted to the liquid crystal cell, so that a liquid crystal in the liquid crystal cell exceeds the NI point, making it impossible to display. To avoid such a trouble, the liquid crystal cell and the color polarizing plate on the incident side are disposed so as to be spaced apart from each other and air or gas is circulated by using a cooling fan to prevent the liquid crystal cell from being overheated (a water-cooling system may be adopted).

In short, in the color liquid crystal projector of the present invention, polarizing plates are respectively arranged on both sides of the liquid crystal cell in the blue channel section and the color polarizing plate with a support according to the present invention is disposed on the incident side or exit side of the liquid crystal cell, or the color polarizing plates with a support of the present invention are disposed on both of the incident side and exit side of the liquid crystal cell. In the case where the color polarizing plate with a support according to the present invention is arranged on the incident side of the liquid crystal cell for the blue channel, the color polarizing plate is arranged so as not to be in contact with the liquid crystal cell. In the case where the color polarizing plate with a support according to the present invention is arranged on the exit side of the liquid crystal cell, the color polarizing plate may either be or not be in contact with the liquid crystal cell, however, it is more preferable that the color polarizing plate being not in contact with the liquid crystal cell. In this case, an iodine type color polarizing plate or the color polarizing plate with a support according to the present invention may be used as the polarizing plate on the incident side in a system having a PBS (polarizing beam splitter) after a light source. When the color polarizing plate is in contact with the liquid crystal cell on the exit side, the liquid crystal cell may become the support of the color polarizing plate of the present invention. When the color polarizing plate is not in contact with the liquid crystal cell, the color polarizing plate with a support according to the present invention, which should have a support other than the liquid crystal cell, is used. As the color polarizing plate with a support according to the present invention which is used on the incident side, those comprising a plate glass as the support are preferable. Also, with a view to durability, it is desirable that the color polarizing plates with a support of the present invention be respectively disposed on both of the incident side and the exit side of the liquid crystal cell. Moreover, it is more preferable that the surface of the polarizing plate of the color polarizing plate with a support according to the present invention be arranged to face the liquid crystal cell and the surface of the support be arranged to face the light source. The incident side of the liquid crystal cell means the side of the cell facing to a light source and the opposite side of the cell is called the exit side.

In the color liquid crystal projector of the present invention, an ultraviolet cut-off filter may preferably be disposed between a light source and the aforementioned polarizing plate with a support on the incident side. Also, the liquid crystal cell to be used is preferably those which are an active matrix type and are formed by sealing a liquid crystal between a transparent substrate where an electrode and a TFT are formed thereon and a transparent substrate where a counter electrode is formed thereon. The light radiated from a light source such as a metal halide lamp is allowed to pass through an ultraviolet cut-off filter and separated into three primary colors. Thereafter, the blue light is allowed to pass through the blue channel in which the color polarizing plate with a support according to the present invention is disposed and then united with other two primary colors. The united light is expanded by a projecting lens and projected on a screen.

EXAMPLES

The present invention will be explained in more detail by way of examples.

Example 1

A dye using the monoazo compound of No. 1 (a compound represented by the aforementioned formula (1), wherein $R_1$, $R_2$ and $R_4$ respectively are a hydrogen atom and $R_3$ is a sulfonic acid group at fourth position) described in the aforementioned Table 1 as raw material was dissolved in water to obtain a dye solution having a concentration of about 0.2%. A Glauber's salt was added to the solution. A 70-$\mu$m-thick PVA film (produced by Kuraray Co., Ltd.,) was immersed in the resulting solution at 40° C. to dye. Then, the PVA film was expanded by four times in the length from the original by employing monoaxial orientation according to the wet method, thereby a polarizing film was obtained (film thickness: 30$\mu$). A TAC film (film thickness: 80$\mu$, trade name: 80UVTAC, manufactured by Fuji Photo Film Co., Ltd.,) was adhered to one surface of the resulting polarizing film and on the other surface of the polarizing film, another TAC film further comprising on one side a UV (ultraviolet)-curable hard coat layer having a thickness of about 10$\mu$ was adhered by using a PVA type adhesive agent to obtain a polarizing plate. An acrylate ester type adhesive agent was applied to one surface of the above polarizing plate to prepare a color polarizing plate with an adhesive layer. Further, on the outer surface of the hard-coat layer of the polarizing plate, AR (anti-reflecting) multi-coat treatment was carried out by using vacuum deposition (vaporization)

and then the polarizing plate was cut into a size of 30 mm×40 mm. The polarizing plate was adhered to a transparent glass plate having an AR layer on one surface, which has the same size as that of the polarizing plate, thereby a color polarizing plate with a support according to the present invention is prepared. This color polarizing plate with a support showed an average single transmittance of 42% and an average crossed transmittance of 0.4% or less at 420 to 500 nm and an average crossed transmittance of 90% at 650 to 780 nm.

Example 2

The same procedures as in Example 1 were carried out to obtain a color polarizing plate with a support according to the present invention, except that 1 part of the same dye used in Example 1 together with 1.5 parts of the dye of No. 13 (a compound represented by the aforementioned formula (2), where $R_5$ is a sulfonic acid group at the fourth position, $R_6$, $R_7$ and $R_8$ respectively are a hydrogen atom and $R_9$ is a benzoylamino group) described in Table 2 were used. This color polarizing plate with a support showed an average single transmittance of 42.0% and an average crossed transmittance of 0.03% or less at 420 to 500 nm and an average crossed transmittance of 90% at 650 to 780 nm. Further, the polarizing plate showed the average crossed transmittance of 0.4% or less up to 560 nm.

Industrial Applicability

According to the present invention, a color polarizing plate with a support for a blue channel having both good brightness and polarizing efficiency can be obtained.

What is claimed is:

1. A color polarizing plate with a support for a liquid crystal projector, comprising a polarizing plate containing a stilbene type water soluble azo dye and a J acid type water-soluble azo dye as a dichroic molecules and said support, wherein the stilbene type water-soluble azo dye is a reaction product between 4,4'-dinitro-2,2'-stilbenedisulfonic acid and a monoazo compound having an aminophenylazobenzene structure of the formula (1), as a free acid:

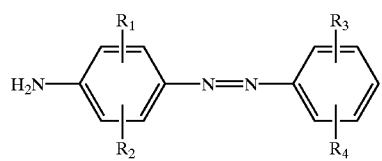

(1)

wherein $R_1$ and $R_2$ independently represent a hydrogen atom, C1–C4 alkyl group or C1–C4 alkoxy group, $R_3$ represents a sulfonic acid group or a carboxyl group and $R_4$ represents a hydrogen atom, a hydroxyl group or C1–C4 alkoxy group;

the J acid type water-soluble azo dye is represented by the formula (2), as a free acid:

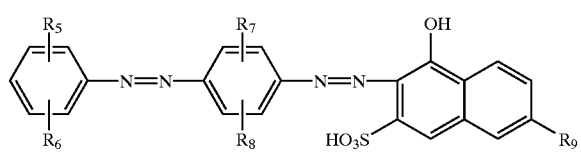

(2)

wherein $R_5$ represents a sulfonic acid group or a carboxyl group, $R_6$ represents a hydrogen atom, a hydroxyl group or C1–C4 alkoxy group, $R_7$ and $R_8$ independently represent a hydrogen atom, C1–C4 alkyl group or C1–C4 alkoxy group and $R_9$ represents phenylamino group, benzoylamino group or p-amino benzoylamino group or 4-hydroxyphenyl-1-azo group; and the polarizing plate has an average single transmittance of 39% or more and an average crossed transmittance of 0.4% or less at 420 to 500 nm and an average crossed transmittance of 60% or more at 650 to 780 nm.

2. The color polarizing plate with a support for a liquid crystal projector according to claim 1, wherein the proportion of the J acid type water-soluble azo dye to be used is 80% by weight or less of the total amount of the dichroic molecule.

3. The color polarizing plate with a support for a liquid crystal projector according to claim 1, wherein the support is a glass molded article.

4. The color polarizing plate with a support for a liquid crystal projector according to claim 3, therein the glass molded article is a molded article made of inorganic glass or organic glass.

5. The color polarizing plate with a support for a liquid crystal projector according to claim 3, wherein the glass molded article is a glass plate, a lens or a prism.

6. A color liquid crystal projector wherein the color polarizing plate with a support as claimed in claim 5 arranged on each of the incident and exit sides of a liquid crystal cell for a blue channel so as not to be in contact with the liquid crystal cell.

7. The color polarizing plate with a support for a liquid crystal projector according to claim 3, wherein the glass molded article is a liquid crystal cell.

8. A color liquid crystal projector wherein the color polarizing plate with a support as claimed in claim 7 is arranged as a liquid crystal cell for a blue channel such that the surface of the polarizing plate is made to be the exit side.

9. The color liquid crystal projector according to claim 8, wherein the color polarizing plate with a support as claimed in claim 5 is arranged on the incident side of quid crystal cell for blue channel so as not to be in act with the liquid crystal cell.

10. The color polarizing plate with a support for a liquid crystal projector according to claim 1, the plate being used for a blue channel.

11. A color liquid crystal projector wherein the color polarizing plate with a support as claimed in claim 1 is arranged in a blue channel.

12. A color liquid crystal projector wherein the color polarizing plate with a support as claimed in claim 1 is arranged on the incident side of a liquid crystal cell for a blue channel so as not be in contact with the liquid crystal cell.

13. The color liquid crystal projector according to claim 12, wherein the polarizing plate surface of the color polarizing plate with a support on the incident side is arranged on the side of the liquid crystal cell.

14. A color liquid crystal projector wherein the color polarizing plate with a support as claimed in claim 1 is arranged on the exit side of a liquid crystal cell for a blue channel so as not to be in contact with the liquid crystal cell.

* * * * *